United States Patent
Li et al.

(10) Patent No.: US 11,645,529 B2
(45) Date of Patent: May 9, 2023

(54) SPARSIFYING NEURAL NETWORK MODELS

(71) Applicant: HEWLETT PACKARD ENTERPRISE DEVELOPMENT LP, Houston, TX (US)

(72) Inventors: Sicheng Li, Palo Alto, CA (US); Cong Xu, Palo Alto, CA (US); Tsung Ching Huang, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 1087 days.

(21) Appl. No.: 15/967,835

(22) Filed: May 1, 2018

(65) Prior Publication Data

US 2019/0340510 A1 Nov. 7, 2019

(51) Int. Cl.
  *G06V 10/82* (2022.01)
  *G06N 3/082* (2023.01)
  *G06N 3/04* (2023.01)
  *G06N 3/063* (2023.01)

(52) U.S. Cl.
  CPC .............. *G06N 3/082* (2013.01); *G06N 3/04* (2013.01); *G06N 3/063* (2013.01)

(58) Field of Classification Search
  CPC ........ G06N 3/082; G06N 3/063; G06N 3/084; G06N 3/0454
  USPC ...................................................... 706/1–62
  See application file for complete search history.

(56) References Cited

U.S. PATENT DOCUMENTS

| | | | |
|---|---|---|---|
| 9,536,177 B2 | 1/2017 | Chalasani et al. | |
| 9,633,306 B2 | 4/2017 | Liu et al. | |
| 10,891,538 B2* | 1/2021 | Dally | G06F 9/3001 |
| 11,048,997 B2* | 6/2021 | Mathew | G06N 3/04 |
| 11,164,312 B2* | 11/2021 | Saltz | G06T 7/11 |
| 2008/0152217 A1* | 6/2008 | Greer | G06V 10/7715 375/240 |
| 2017/0228659 A1* | 8/2017 | Lin | G06N 20/00 |
| 2017/0344876 A1* | 11/2017 | Brothers | G06N 3/04 |
| 2018/0046916 A1* | 2/2018 | Dally | G06N 3/063 |
| 2018/0082181 A1* | 3/2018 | Brothers | G06N 3/0454 |
| 2018/0114114 A1* | 4/2018 | Molchanov | G06N 3/082 |

(Continued)

FOREIGN PATENT DOCUMENTS

| | | | |
|---|---|---|---|
| WO | WO-2014205231 | 12/2014 | |
| WO | WO-2019190340 A1 * | 10/2019 | G06N 3/082 |

OTHER PUBLICATIONS

Liu, Baoyuan et al.; Sparse Convolutional Neural Networks; IEEE Xplore; 2015; CVPR2015; pp. 806-814. (Year: 2015).*

(Continued)

*Primary Examiner* — Brandon S Cole
(74) *Attorney, Agent, or Firm* — Trop, Pruner & Hu, P.C.

(57) ABSTRACT

A technique includes modifying a neural network model to sparsify the model. The model includes a plurality of kernel element weights, which are parameterized according to a plurality of dimensions. Modifying the model includes, in a given iteration of the plurality of iterations, training the model based on a structure regularization in which kernel element weights that share a dimension in common are removed as a group to create corresponding zero kernel elements in the model; and compressing the model to exclude zero kernel element weights from the model to prepare the model to be trained in another iteration.

21 Claims, 5 Drawing Sheets

(56) References Cited

U.S. PATENT DOCUMENTS

| | | | |
|---|---|---|---|
| 2018/0181864 A1* | 6/2018 | Mathew | G06F 7/5443 |
| 2018/0218518 A1* | 8/2018 | Yan | G06T 9/002 |
| 2018/0260711 A1* | 9/2018 | Zhang | G06N 3/0481 |
| 2018/0293496 A1* | 10/2018 | Vogels | G06N 3/04 |
| 2019/0108436 A1* | 4/2019 | David | G06N 3/02 |
| 2019/0251441 A1* | 8/2019 | Lu | G06N 3/0481 |
| 2021/0089864 A1* | 3/2021 | Dally | G06F 9/3887 |

OTHER PUBLICATIONS

Lebedev, Vadim et al.; Fast ConvNets Using Group-wise Brain Damage; Computer Vision Foundation; IEEE Xplore; 2016; pp. 2554-2564. (Year: 2016).*

Wen, Wei et al.; Learning Structured Sparsity in Deep Neural Networks; 30th Conference on Neural Information Processing Systems (NIPS 2016); pp. 1-9. (Year: 2016).*

Zhou, Hao et al.; Less Is More: Towards Compact CNNs; Springer 2016; ECCV 2016, Part IV, LNCS 9908, pp. 662-677. (Year: 2016).*

Park, Jongsoo et al.; Faster CNNS With Direct Sparse Convolutions and Guided Pruning; arXiv:1608.01409v5 [cs.CV] Jul. 28, 2017; pp. 1-12. (Year: 2017).*

Scardapane, S et al.; Group Sparse Regularization for Deep Neural Networks; 2017 Elsevier; Neurocomputing, 241, pp. 81-89. (Year: 2017).*

Molchanov, Pavlo et al.; Pruning Convolutional Neural Networks for Resource Efficient Inference; arXiv:1611.06440v2 [cs.LG] Jun. 8, 2017; pp. 1-17. (Year: 2017).*

Li, Hao et al.; Pruning Filters for Efficient Convnets; arXiv:1608.08710v3 [cs.CV] Mar. 10, 2017; pp. 1-13. (Year: 2017).*

Liu, Z. et al.; "Learning Efficient Convolutional Networks Through Network Slimming"; Aug. 22, 2017; 10 pages.

Neklyudov, K. et al.; "Structured Bayesian Pruning via Log-normal Multiplicative Noise"; 2017; 10 pages.

Page, A. et al.; "Sparcnet: a Hardware Accelerator for Efficient Deployment of Sparse Convolutional Networks"; May 2017; 32 pages.

Wen, B. et al.; "Structured Overcomplete Sparsifying Transform Learning with Convergence Guarantees and Applications"; Oct. 14, 2014; 33 pages.

Wen, W. et al.; "Learning Structured Sparsity in Deep Neural Networks"; Oct. 18, 2016; 10 pages.

\* cited by examiner

SPARSIFYING NEURAL NETWORK MODELS

BACKGROUND

An artificial neural network (also called a "neural network" herein) may be used to learn tasks without task-specific programming. In general, a neural network is a collection of nodes, called "neurons," and the neurons are connected to each other so that a given neuron may receive one or multiple signals, process the signal(s) and then signal neurons connected to the given neuron. In general, the signal at a connection of a given neuron is a real number, and the output of the given neuron is calculated as a non-linear function of the sum of the inputs.

A convolutional neural network (CNN) is a feed-forward artificial neural network that has been used in such applications as image recognition. The CNN includes an input layer, an output layer and multiple hidden layers between the input and output layers. The hidden layers may include, as examples, convolutional layers, pooling layers and fully connected layers. A convolutional layer applies a convolution operation to the input, passing the result to the next layer. A pooling layer combines the outputs of neurons at one layer into a single layer in the next layer. A fully connected layer connects every neuron in one layer to every neuron in another layer.

DETAILED DESCRIPTION

Figure 1:
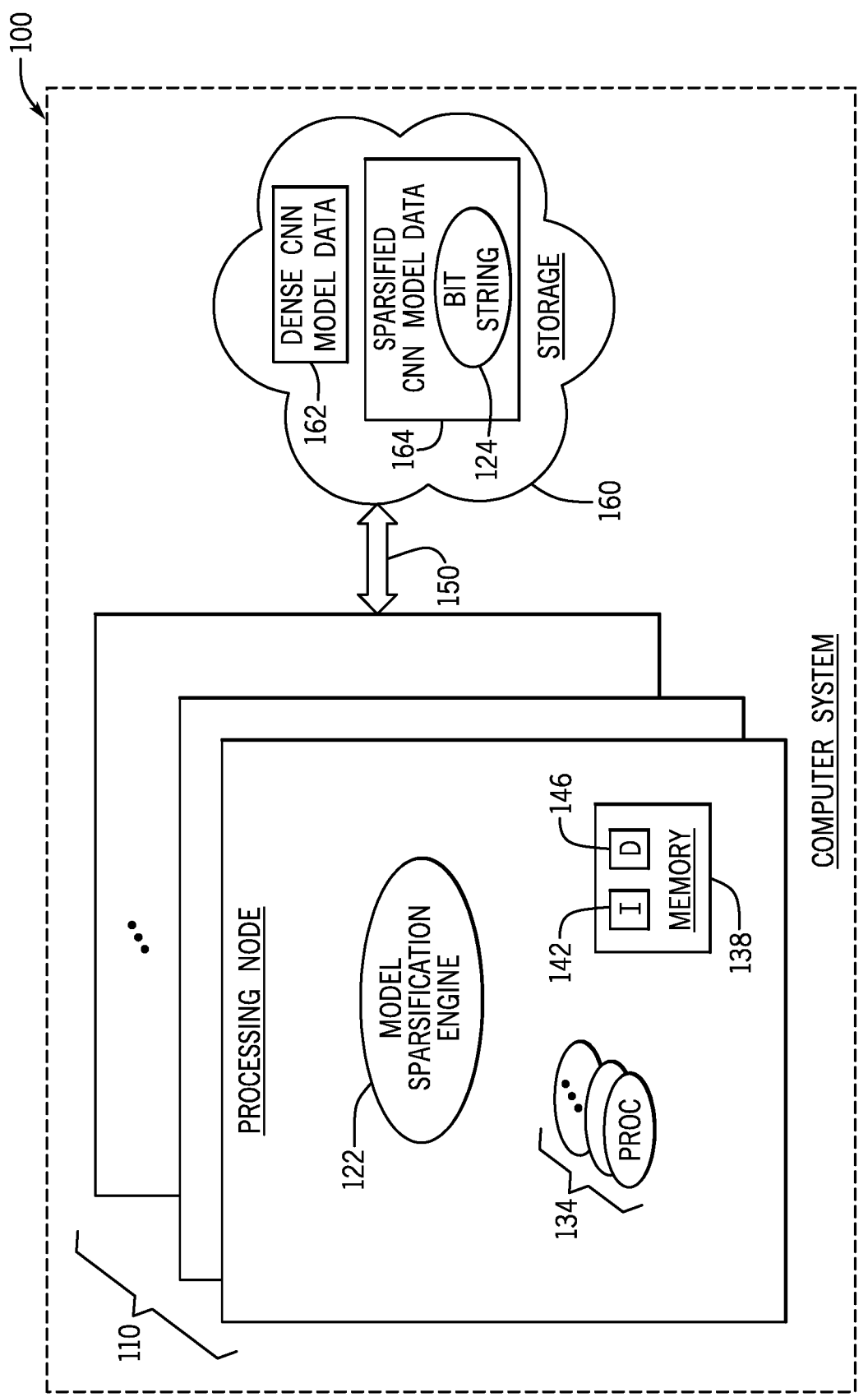
FIG. 1 is a schematic diagram of a computer system having a neural network model sparsification engine according to an example implementation.

A neural network model may have a relatively large amount of data representing weights for the neurons, or kernels, of the model. In this manner, each kernel may have multiple elements, and the neural network model may have data representing weights that are assigned to these kernel elements. For example, the neural network model may be a deep convolutional neural network (CNN) model, and for a given convolutional layer of the model, data may be stored representing weights for the elements of each neuron, or kernel, of the model.

In general, a given kernel may have an associated filter; the filter may have a particular dimension; and the filter may be applied across a given set of input channels. Correspondingly, each kernel may have a relatively large number of elements and a corresponding relatively large number of weights for its element weights. Accordingly, a CNN model may have a relatively large amount of data representing the kernel element weights, which causes the training and inference process to be relatively memory and computationally intensive. This may present challenges to using a neural network, such as a CNN, on resource constrained electronic devices (for example, cellular telephones, smartphones, tablets, wearable devices, and so forth) as such a device may lack sufficient memory and processing resources.

To reduce its resource footprint, a neural network model may be processed for purposes of "sparsifying" the model. In this context, the "sparsity" of a neural network model refers to a ratio of the number of zero elements (i.e., the number of kernel elements having associated zero values) to the total number of kernel elements of the model. Sparsification techniques, in general, remove redundant connections of the neural network while still maintaining a certain level of accuracy.

One way to sparsify a neural network model, such as a CNN model, is to randomly remove network connections. However, such an approach may result in data misalignment in that the non-zero kernel element weights may exhibit poor data locality (i.e., may not be grouped together in contiguous regions of memory), thereby incurring a relatively high index overhead to reference the non-zero elements and compress these non-zero elements.

In accordance with example implementations that are described herein, a neural network model, such as a CNN model, is sparsified in a process that imposes a sparse regularization constraint. In particular, as described herein, a regularization constraint called a "group lasso" is applied in the training of the neural network model. In general, the group lasso identifies kernel elements of the neural network model, which have one or more dimensions in common. Due to the regularization constraint that is imposed by the group lasso, the resulting kernel elements that have zero weights share one or multiple dimensions in common, and as such, the non-zero weights are grouped together in contiguous memory regions (i.e., the regularization constraint imposes a high degree of data locality for the non-zero kernel element weight data).

Moreover, the regularization constraint imposes data locality for the zero value kernel element weights as well so that if stored in memory, corresponding zero weight data would be stored in contiguous memory regions. Due to this data locality, the kernel element weight data for the neural network model may be compressed using a relatively simple bit string to represent the compressed data. In particular, in accordance with example implementations, the bit string may have corresponding bits, where a certain bit, such as a "one" bit, represents a given unit of data, such as a row or column, which has all non-zero kernel element weights and a "0" bit that represents a corresponding group of all zero weights. Representing the data for the neural network model in this manner allows the zero values to be readily identified during the training (and sparsification) of the model so that multiplication operations involving zero values may be avoided, or bypassed. Moreover, this representation results in a greatly reduced memory footprint as the zero value weights may not be stored in memory, thereby allowing the data for the sparsified model to be stored in a limited memory electronic device and processed by the electronic devices limited processing resources.

In accordance with example implementations, an iterative process is used to train the model to sparsify the model in that the sparsity of the model eventually converges over a number of iterations. Subsequently, the sparsified model may then be fine tuned. In accordance with example implementations, the fine tuning of the sparsified model includes maintaining the model at a given sparsity and performing multiple training iterations to improve the accuracy of the sparsified model. In this manner, the training iterations may be performed until the accuracy converges at a particular accuracy level.

Referring to FIG. 1, as a more specific example, in accordance with some implementations, a computer system 100 may include one or multiple neural network model sparsification engines. As examples, the computer system 100 may be a public cloud-based computer system, a private cloud-based computer system, a hybrid cloud-based computer system (i.e., a computer system that has public and private cloud components), a private computer system having multiple computer components disposed on site, a private computer system having multiple computer components geographically distributed over multiple locations, and so forth.

Regardless of its particular form, in accordance with some implementations, the computer system 100 may include one or multiple processing nodes 110; and each processing node 110 may include one or multiple personal computers, workstations, servers, rack-mounted computers, special purpose computers, and so forth. Depending on the particular implementations, the processing nodes 110 may be located at the same geographical location or may be located at multiple geographical locations. Moreover, in accordance with some implementations, multiple processing nodes 110 may be rack-mounted computers, such that sets of the processing nodes 110 may be installed in the same rack. In accordance with further example implementations, the processing nodes 110 may be associated with one or multiple virtual machines that are hosted by one or multiple physical machines.

In accordance with some implementations, the processing nodes 110 may be coupled to a storage 160 of the computer system 100 through network fabric 150. In general, the network fabric 150 may include components and use protocols that are associated with any type of communication network, such as (as examples) Fibre Channel networks, iSCSI networks, ATA over Ethernet (AoE) networks, HyperSCSI networks, local area networks (LANs), wide area networks (WANs), global networks (e.g., the Internet), or any combination thereof.

The storage 160 may include one or multiple physical storage devices that store data using one or multiple storage technologies, such as semiconductor device-based storage, phase change memory-based storage, magnetic material-based storage, memristor-based storage, and so forth. Depending on the particular implementation, the storage devices of the storage 160 may be located at the same geographical location or may be located at multiple geographical locations.

In accordance with example implementations, a given processing node 110 may contain a neural network model sparsification engine 122 (also called a "model sparsification engine 122" herein), which is constructed to access data 162 representing a dense CNN model (stored in storage 160, for example) and perform a sparsification process to remove redundant connections of the CNN model. As described herein, the model sparsification engine 122 performs the sparisification process in multiple training iterations (hundreds of thousands of iterations, for example) for purposes of increasing the sparsity of the original dense CNN model and converging the resulting model on a certain degree, or level, of sparsification.

In particular, in accordance with example implementations, the training iterations are successive, in that a given training iteration processes an intermediate model (i.e., a sparsified version of the original dense CNN model) based on a cost function (further described herein) and in particular, performs back propagation to adjust the set of selected kernel element weights that have corresponding zero values. Moreover, in accordance with example implementations, the model sparsification engine 122 performs the training iteration in a manner that preserves a locality of data for the model in that zero value kernel weights are grouped together (in corresponding rows or columns) and nonzero kernel weights are grouped together in corresponding rows/columns.

The model sparsification engine 122, in accordance with example implementations, applies a kernel element weight compression, which allows the engine 122 to bypass multiplication operations in the training iterations, which involve zero value kernel weights (i.e., avoid multiplication operations that would result in null, or zero, products). In particular, as further described herein, in accordance with some implementations, the model sparsification engine 122 applies a bit string-based compression scheme, which represents, by individual bits, whether a particular unit of virtual memory storage (a row or a column, for example) stores zero values or non-zero values. Correspondingly, the non-zero values are actually stored in memory and the zero values are not. Moreover, as described herein, the data locality may be achieved through the model sparsification engine's use of a structure regularization constraint, such as a group lasso, in the training iterations.

In accordance with example implementations, the processing node 110 may include one or multiple physical hardware processors 134, such as one or multiple central processing units (CPUs), one or multiple CPU cores, and so forth. Moreover, the processing node 110 may include a local memory 138. In general, the local memory 138 is a non-transitory memory that may be formed from, as examples, semiconductor storage devices, phase change storage devices, magnetic storage devices, memristor-based devices, a combination of storage devices associated with multiple storage technologies, and so forth.

Regardless of its particular form, the memory 138 may store various data 146 (data representing compression bit strings; dense CNN models; final, sparsified CNN models; intermediate models representing intermediate versions of sparsified CNN models derived by the training process; group lasso constraints identifying kernel weights having corresponding zero values; a mask representing zero value kernel weights; accuracy constraints; sparsity constraints; and so forth). The memory 138 may also store instructions 142 that, when executed by one or multiple processors 134, cause the processor(s) 134 to form one or multiple components of the processing node 110, such as, for example, the model sparsification engine 122.

In accordance with some implementations, the model sparsification engine 122 may be implemented at least in part by a hardware circuit that does not include a processor executing machine executable instructions. In this regard, in accordance with some implementations, the model sparsification engine 122 may be formed in whole or in part by a hardware processor that does not execute machine executable instructions, such as, for example, an application specific integrated circuit (ASIC), a field programmable gate array (FPGA), and so forth. Thus, many implementations are contemplated, which are within the scope of the appended claims.

Figure 2:
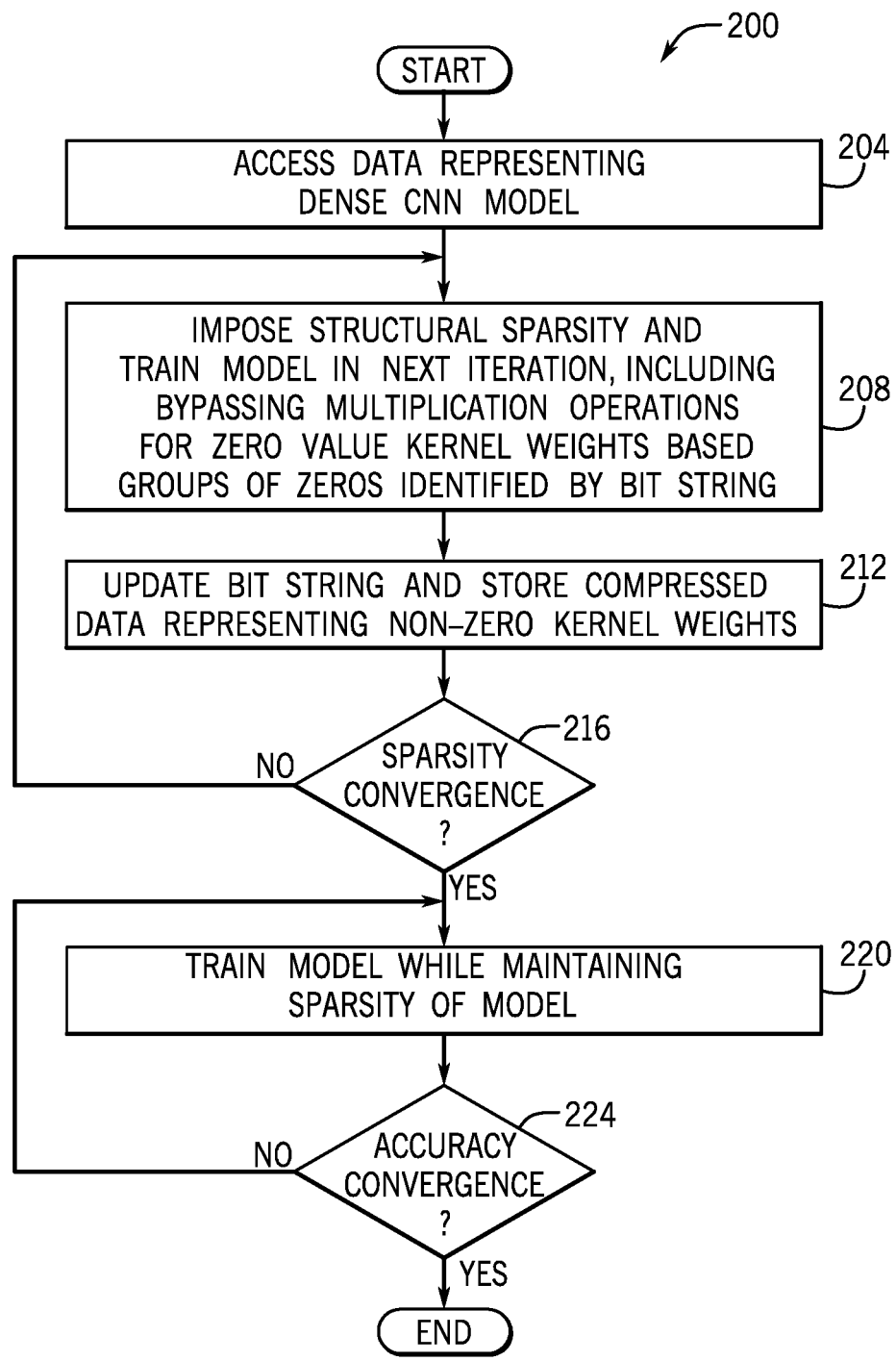
FIG. 2 is a flow diagram depicting a technique to sparsify a deep convolutional neural network (CNN) model according to an example implementation.

Referring to FIG. 2 in conjunction with FIG. 1, in accordance with example implementations, the model sparsification engine 122 may perform a technique 200 for purposes of sparsifying a dense CNN model to produce a corresponding sparsified CNN model. In particular, pursuant to the technique 200, the model sparsification engine 122 may access (block 204) data that represents a dense CNN model. In this manner, the dense CNN model may be a pre-trained model but may have a footprint that may be challenging (both from a memory and computational standpoint) to incorporate into a resource constrained device, such as a smartphone, tablet, wearable device (a watch, for example), and so forth.

Pursuant to the technique 200, the model sparsification engine 122 imposes (block 208) a structural constraint in the sparsification process and in particular, applies this constraint in a number of iterations (hundreds of thousands of iterations, as an example). In this manner, in accordance with some implementations, the structural sparsity constraint may adjust multiple structures of the model during back propagation, including the number of filters and filter shapes within each layer of the model. Compared to a model sparsified using random pruning, the data layout of the structured sparse model has a regular pattern, which leads to a significantly improved memory efficiency. In this manner, the data has locality, in that non-zero kernel weights are grouped together (in corresponding rows/columns of memory, for example), and zero value kernel weights are grouped together. As depicted in block 208, due to the imposed structural sparsity, a given training iteration may include bypassing multiplication operations for zero value kernel weights based on a group of zeros that are identified by a bit string mask. As further described herein, in accordance with example implementations, the bit string mask identifies, on a bitwise basis, whether a given group of kernel element weights are zero or non-zero. Accordingly, during the multiplication operations that occur during back propagation of a given training interval, the model sparsification engine 122 may, using the bit string, bypass multiplication operations involving zero value kernel element weights.

Thus, in a given training iteration, the model sparsification engine 122 imposes (block 208) structural sparsity and trains the model, and at the conclusion of the given training interval, the model sparsification engine 122 updates (block 212) the bit string, stores compressed data in memory representing non-zero kernel weights and does not store data in memory corresponding to the zero kernel element weights. Upon determining whether the sparsity of the model has converged (decision block 216), the model sparsification engine 122 may (if no convergence) perform another training iteration by returning to block 208. Otherwise, in accordance with example implementations, the model sparsification engine 122 may enter the next phase in which the now sparsified model is "fine tuned" to improve the accuracy of the model. In this manner, in accordance with example implementations, the model sparsification engine may train (block 220) the model while maintaining the sparsity of the model in a given training iteration in which the sparsity is held constant. If the model sparsification engine 122 determines (decision block 224) that the accuracy of the sparsified model has converged, then the fine tuning is complete. Otherwise, the model sparsification engine 122 may perform another iteration, and thus, control returns to block 220.

In accordance with example implementations, the model sparsification engine 122 applies group lasso regularization to prune weights of the dense CNN model by groups. In this manner, in accordance with example implementations, the kernel element weights of a given convolutional layer may be represented by "$K_{(n,c,h,h)}$," which represents a bank of N filters (corresponding to the "n" index in "$K_{(n,c,h,h)}$") across C input channels (corresponding to the "c" index of $K_{(n,c,h,h)}$"). Each filter has a dimension of H×H (corresponding to the "h" index of "$K_{(n,c,h,h)}$").

By applying sparsity regularization, in accordance with example implementations, the model sparsification engine 122 may, in general, define a cost target that is used in the back propagation using the following cost function (called "E(K)"):

$$E(K) = E_D + \lambda_g \cdot \Sigma_{l=1}^{L} R_g [\![ K_{(n,c,h,h)} ]\!], \quad \text{Eq. 1}$$

In Eq. 1, "$E_D$" represents the data loss from back propagation; "L" represents the number of layers in the neural network model; "$\lambda_g$" represents the regularization constraint on each layer; "$R_g[\![\cdot]\!]$" represents a group lasso function that zeros out kernel element weights in specific groups; and "$K_{(n,c,h,h)}$" represents the collection of all kernel element weights.

In accordance with example implementations, the group lasso selects kernel elements that share one or multiple dimensions in common, and this type of structured regularization constraint, in turn, preserves locality of the corresponding data for the model. For example, assume that "$K_{(n,:,:,:)}$" represents the $n^{th}$ filter and "$K_{(:,c,h,h)}$" represents the weights located in a two-dimensional (2-D) filter across the $c^{th}$ channel. Applying the group lasso to $K_{(n,:,:,:)}$ and $K_{(:,c,h,h)}$ leads to filter-wise and shape-wise sparsity, respectively. Accordingly, taking into account the filter-wise and shape-wise sparsity, the E(K) cost function of Eq. 1 may be rewritten as follows:

$$E(K) = E_D + \lambda_g \cdot \Sigma_{l=1}^{L} R_g [\![ K_{(n,c,h,h)} ]\!] = E_D + \Sigma_{l=1}^{L}$$
$$(\lambda_{g\_filter} \cdot R_g [\![ K_{(n,:,:,:)} ]\!] + \lambda_{g\_shape} \cdot R_g [\![ K_{(:,c,h,h)} ]\!])^? \quad \text{Eq. 2}$$

where "$\lambda_{g\_filter}$" represents the filter-wise regularization constraint; and "$\lambda_{g\_shape}$" represents the shape-wise regularization constraint.

In accordance with example implementations, the training iterations to sparsify the model, as well as the subsequent fine tuning by the model sparsification engine 122, may be represented by the following pseudocode:

---
Pseudocode Example 1

Initilize $K^{(0)} = K$, number of iterations t = 1;
    \_\_\_\_\_Imposing structure regularization\_\_\_\_\_
repeat
    for each iteration do $$K^{(t)} = K^{(t-1)} - \eta^{(t-1)} \frac{\partial E(K^{(t-1)})}{\partial K^{(t-1)}};$$

$$K^{(t)} = K^{(t)} \cdot \text{Mask}^{(t)}; \text{ //kernel compression}$$
    t = t + 1;
    end for
until converged
    \_\_\_\_\_Fine-tuning to retain accuracy\_\_\_\_\_
repeat
    for each iteration do $$K^{(t)} = K^{(t-1)} - \eta^{(t-1)} \frac{\partial E(K^{(t-1)})}{\partial K^{(t-1)}};$$

t = t + 1;
    end for
until converged

In Pseudocode Example 1, "η" represents the learning rate at iteration t.

The above-described convolution of feature maps and kernel filters involves relatively intensive mathematical operations, such as three-dimensional (numeral 3-D), multiply and accumulate (MAC) operations. For an irregular data access pattern, representing a convolutional layer with a stack of 2-D images may not be efficient for a sparse CNN model. However, due to the structure regularization imposed by the model sparsification engine 122, both the kernel weights and the feature maps may be represented as 2-D matrices having the following advantages. Data locality is well preserved when accessing sparse kernel weights with the structured data layout. The 3-D filter $K_{(n,:,:,:)}$ is reorganized to a row in the kernel matrix, where each column is a collection of weights, i.e., $K_{(:,c,h,h)}$. The filter-wise and shape-wise sparsity may directly map to the zero rows and columns.

Figure 3:
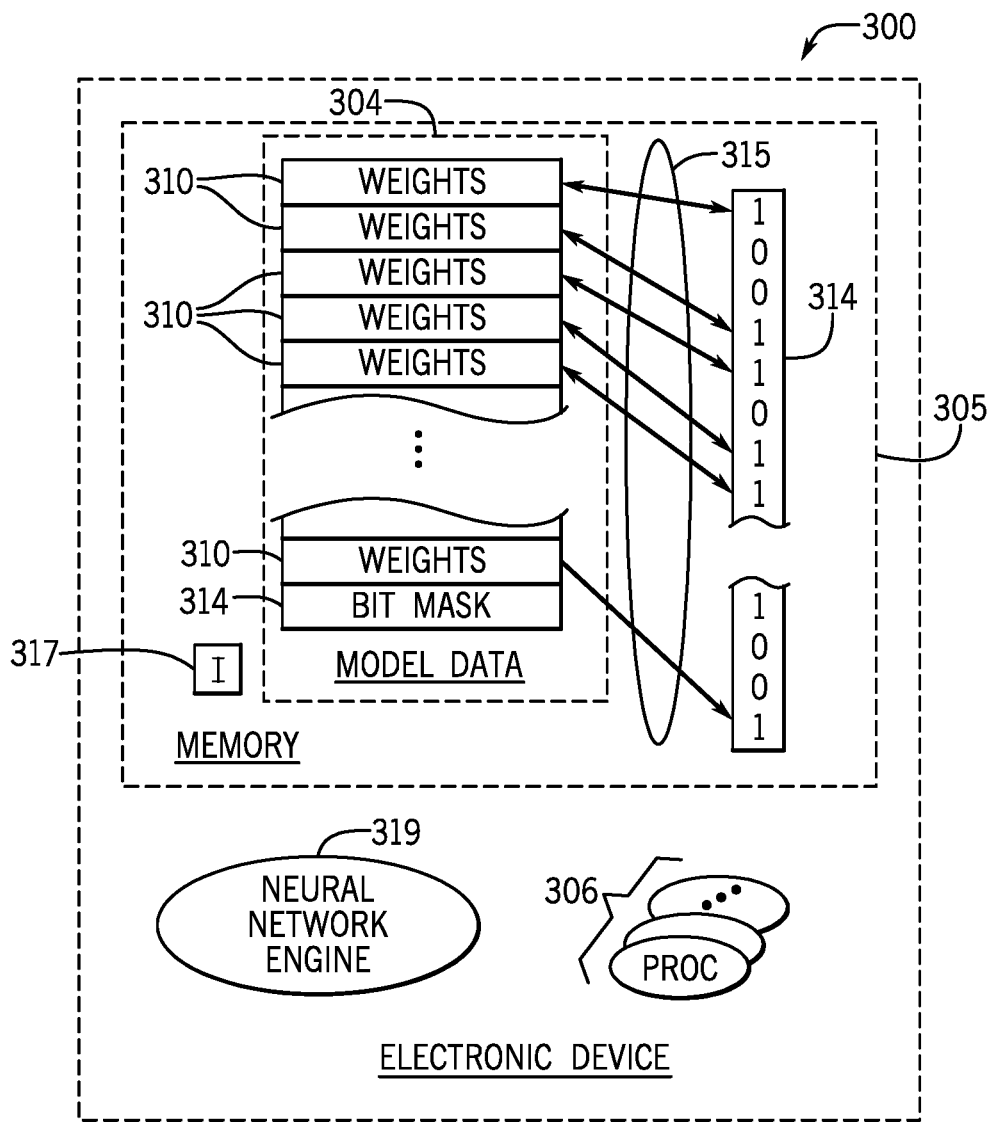
FIG. 3 is a schematic diagram of an electronic device storing data that represents a sparsified neural network model according to an example implementation.

Due to the data compression, the memory footprint of the sparsified neural network model may be suitable for use on a resource constrained electronic device. As an example, FIG. 3 depicts an electronic device 300 that may store neural network model data 309 in its memory 305 in accordance with example implementations. In general, the electronic device 300 may include a neural network engine 319, which uses the model data 304 to form a neural network (a sparsified CNN, for example) for purposes of processing an input and correspondingly generating an output. For example, the electronic device 300 may use the neural network engine 319 for purposes of forming an artificial neural network to process image data for image recognition purposes. The neural network engine 319 may be used for other purposes, in accordance with further implementations.

For purposes of implementing the neural network engine 319, the electronic device 300 may, for example, include one or multiple processors 306 which, may, for example, may execute machine executable instructions 317 that are stored in the memory 304. Upon execution of the instructions 317, for example, the neural network engine 319 may be created and access the model data 304, which corresponds to the kernel element weights of the sparsified and trained neural network model. In accordance with some implementations, the neural network model may be a CNN model.

As depicted in FIG. 3, in accordance with example implementations, the model data 309 may be arranged in a relatively compact data structure, or layout, in the memory 305. In this manner, in accordance with some implementations, the model data 304 may be arranged so that a contiguous part of the memory 305 stores non-zero kernel element weights 310. Moreover, the model data 309 may not include any non-zero kernel element weights. In accordance with some implementations, each set of weights 310 depicted in FIG. 3 may be, for example, a particular row or column of memory storage corresponding to non-zero kernel element weights.

The model data 309 further includes, in accordance with example implementations, data 314 representing a bit string mask for the kernel element weights. In this manner, as illustrated in FIG. 3, the bit string mask 314 may include bits of "1" and "0". As an example, a "1" bit may represent a corresponding set of non-zero value kernel element weights that are stored in a corresponding contiguous memory region (a row of a column of memory for example). A "0" bit may represent a corresponding group of zero value kernel elements, and accordingly, no corresponding data is stored in the model data 304. As such, the bit string 314 indicates a mapping 315 between the kernel elements and corresponding non-zero value kernel element weights.

As can be seen from FIG. 3, the structure of the model data 304 provides a uniform data layout, and the non-zero value kernel element weights 310 may be represented by matrices that are adopted to different convolutional layers with various input features/kernel sizes or string sizes.

In accordance with example implementations, the neural network engine 319 may include a matrix multiplication-based accelerator, which is constructed to handle operations on both sparse convolutional layers (using the bit mask 314 to recognize groups of zero value kernel element weights and columns/rows in memory of non-zero kernel element weights) and fully-connected layers, thereby using fewer computational resources to specifically process the fully connected layers. Moreover, due to the use of the bit mask 314, the neural network engine 319, by working with a compressed model, has a relatively reduced total run time, associated with both computations and memory access, by skipping, or bypassing, multiplications with zero values.

Figure 4:
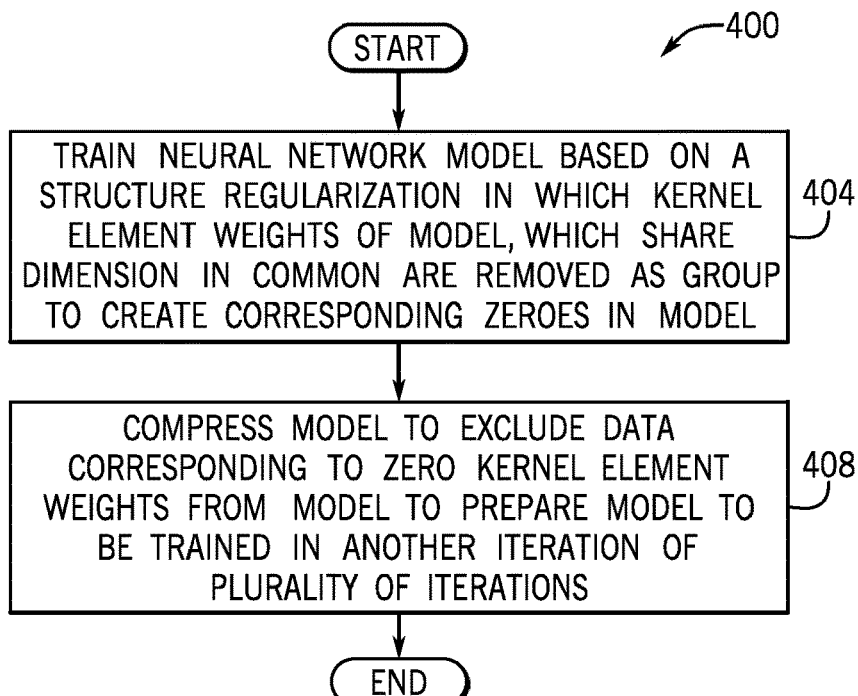
FIG. 4 is a flow diagram depicting a technique to sparsify a neural network model according to an example implementation.

Thus, referring to FIG. 4, in accordance with example implementations, a technique 400 may be used to modify a neural network model to sparsify the model.

The model may include a plurality of kernel weights that are parameterized according to a plurality of dimensions. Modifying the model includes, in a given iteration of the plurality of iterations, training (block 404) the model based on a structure regularization in which kernel element weights that share a dimension in common are removed as a group to create corresponding zeroes in the model; and compressing (block 404) the model to exclude data corresponding to zero kernel element weights from the model to prepare the model to be trained in another iteration of the plurality of iterations.

Figure 5:
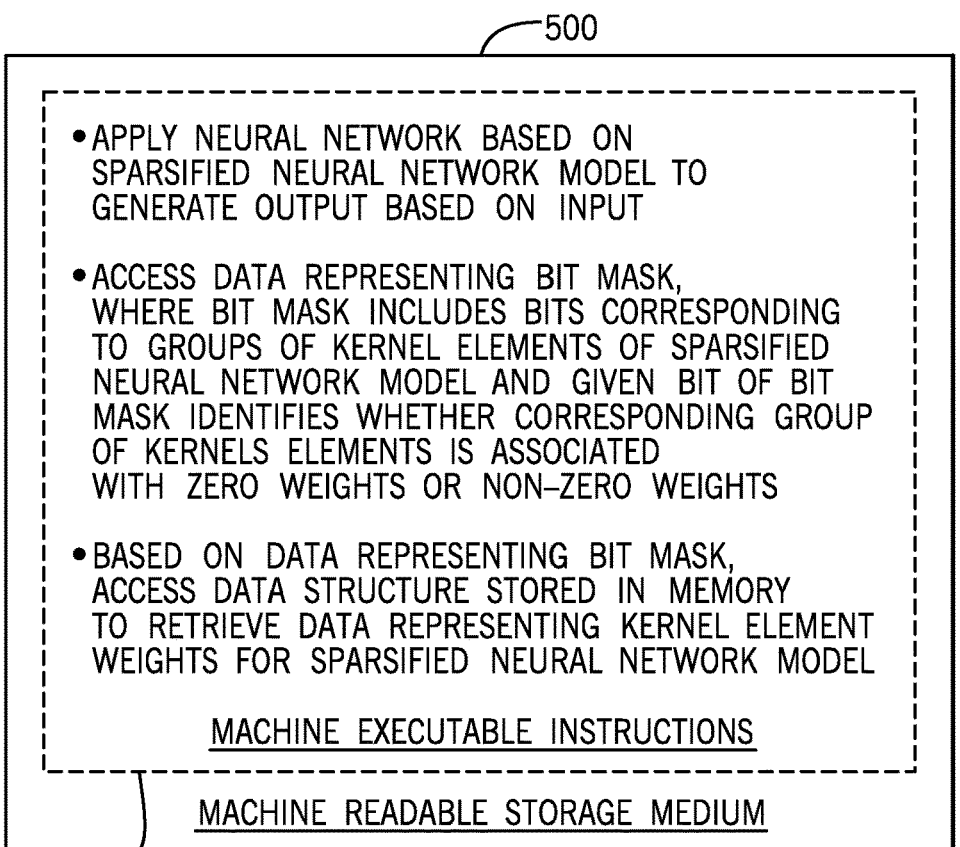
FIG. 5 is an illustration of machine executable instructions stored on a machine readable storage medium to sparsify a neural network model according to an example implementation.

Referring to FIG. 5, in accordance with example implementations, a machine readable storage medium 500 may store non-transitory machine executable instructions 518 that, when executed by a machine, cause the machine to apply a neural network model based on a sparsified neural network model to generate an output based on an input; and access data representing a bit mask. The bit mask includes bits that correspond to kernel elements of the sparsified neural network model, and a given bit of the bit mask identifies whether a corresponding group of kernel elements is associated with zero weights or non-zero weights. The instructions when executed by the machine, cause the machine to, based on the data representing the bit mask, access a data structure that is stored in a memory to retrieve data representing kernel element weights for the sparsified neural network model.

Figure 6:
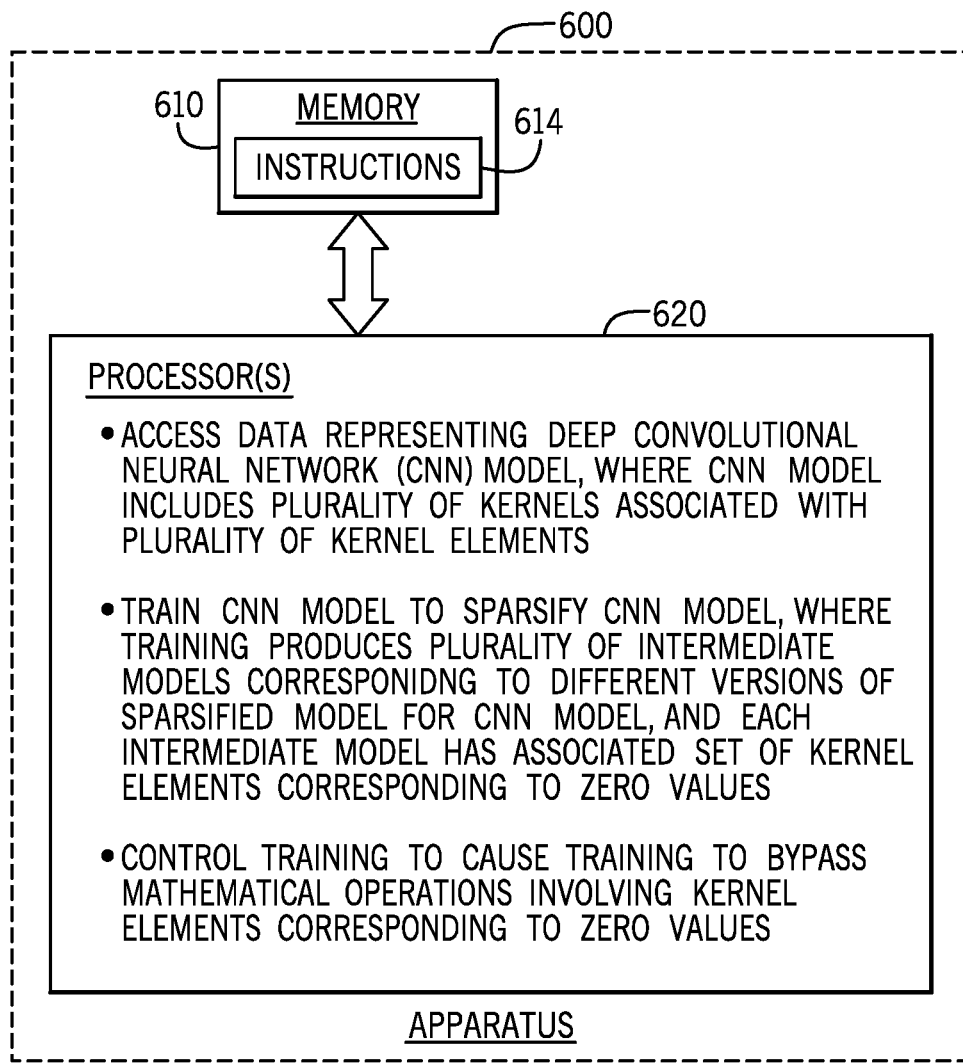
FIG. 6 is a schematic diagram of an apparatus to sparsify a deep convolutional neural network (CNN) model according to an example implementation.

Referring to FIG. 6, in accordance with example implementations, an apparatus 600 includes at least one processor 620 and a memory 610 to store instructions 614 that, when executed by the processor(s) 620, cause the processor(s) 620 to access data representing a deep convolutional neural network (CNN) model. The model includes a plurality of kernels that are associated with a plurality of kernel elements. The instructions, when executed by the processor(s), cause the processor(s) 620 to train the CNN model to sparsify the CNN model. The training produces a plurality of intermediate models, correspond to different versions of a sparsified model for the CNN model. Each intermediate model has an associated set of kernel elements corresponding to zero values. The instructions, when executed by the processor(s) 620, cause the processor(s) 620 to control the train to cause the train to bypass mathematical operations involving the kernel elements corresponding to zero values.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
    at least one processor; and
    a memory to store instructions that, when executed by the at least one processor, cause the at least one processor to:
        access data representing a deep convolutional neural network (CNN) model, wherein the CNN model comprises a plurality of kernels associated with a plurality of kernel elements;
        train the CNN model to sparsify and fine-tune the CNN model, wherein the training produces a plurality of intermediate models corresponding to different versions of a sparsified model for the CNN model, and each intermediate model has an associated set of kernel elements corresponding to zero values, wherein the training performs multiple training iterations on the CNN model and maintains the CNN model at a given sparsity level during the multiple training iterations, and fine-tunes the sparsified model to produce the plurality of intermediate models; and
        control the training to cause the training to bypass mathematical operations involving the kernel elements corresponding to zero values.

2. The apparatus of claim 1, wherein the instructions, when executed by the at least one processor, cause the at least one processor to:
    store nonzero values for the kernel elements of the plurality of kernel elements in the memory which do not correspond to zero values; and
    store data in the memory representing a mask identifying the kernel elements corresponding to zero values.

3. The apparatus of claim 2, wherein the mask comprises bits, and a given bit of the bits represents multiple kernel weights having corresponding zero values.

4. The apparatus of claim 2, wherein the nonzero values comprises columns or rows of nonzero data.

5. The apparatus of claim 2, wherein the mask comprises a bit string mask.

6. The apparatus of claim 1, wherein the instructions that, when executed by the at least one processor, cause the at least one processor to:
    perform the training until the intermediate models converge on a sparsity to produce a given intermediate model;
    tune the given intermediate model, wherein the tuning produces a second plurality of models corresponding to different versions of a second sparsified model for the CNN model; and
    perform the tuning until the second plurality of models converge on an accuracy.

7. The apparatus of claim 6, wherein the instructions that, when executed by the at least one processor, cause the at least one processor to:
    use a group lasso in the training to manipulate sparsities of the intermediate models.

8. A computer-implemented method comprising:
    accessing, by an apparatus comprising at least one processor, data representing a deep convolutional neural network (CNN) model, wherein the CNN model comprises a plurality of kernels associated with a plurality of kernel elements;
    training the CNN model to sparsify and fine-tune the CNN model, wherein the training produces a plurality of intermediate models corresponding to different versions of a sparsified model for the CNN model, and each intermediate model has an associated set of kernel elements corresponding to zero values, wherein the training performs multiple training iterations on the CNN model and maintains the CNN model at a given sparsity level during the multiple training iterations, and fine-tunes the sparsified model to produce the plurality of intermediate models; and
    controlling the training to cause the training to bypass mathematical operations involving the kernel elements corresponding to zero values.

9. The method of claim 8, further comprising:
    storing nonzero values for the kernel elements of the plurality of kernel elements in the memory which do not correspond to zero values; and
    storing data in the memory representing a mask identifying the kernel elements corresponding to zero values.

10. The method of claim 9, wherein the mask comprises bits, and a given bit of the bits represents multiple kernel weights having corresponding zero values.

11. The method of claim 9, wherein the nonzero values comprises columns or rows of nonzero data.

12. The method of claim 9, wherein the mask comprises a bit string mask.

13. The method of claim 8, further comprising:
    performing the training until the intermediate models converge on a sparsity to produce a given intermediate model;
    tuning the given intermediate model, wherein the tuning produces a second plurality of models corresponding to different versions of a second sparsified model for the CNN model; and
    performing the tuning until the second plurality of models converge on an accuracy.

14. The method of claim 13, further comprising:
    using a group lasso in the training to manipulate sparsities of the intermediate models.

15. A non-transitory machine readable storage medium storing instructions, that, when executed by a machine, cause the machine to:
    access data representing a deep convolutional neural network (CNN) model, wherein the CNN model comprises a plurality of kernels associated with a plurality of kernel elements;
    train the CNN model to sparsify and fine-tune the CNN model, wherein the training produces a plurality of intermediate models corresponding to different versions of a sparsified model for the CNN model, and each intermediate model has an associated set of kernel elements corresponding to zero values, wherein the training performs multiple training iterations on the CNN model and maintains the CNN model at a given sparsity level during the multiple training iterations, and fine-tunes the sparsified model to produce the plurality of intermediate models; and
    control the training to cause the training to bypass mathematical operations involving the kernel elements corresponding to zero values.

16. The storage medium of claim 15, wherein the instructions, when executed by the machine, cause the machine to:

store nonzero values for the kernel elements of the plurality of kernel elements in the memory which do not correspond to zero values; and store data in the memory representing a mask identifying the kernel elements corresponding to zero values.

17. The storage medium of claim 16, wherein the mask comprises bits, and a given bit of the bits represents multiple kernel weights having corresponding zero values.

18. The storage medium of claim 16, wherein the nonzero values comprises columns or rows of nonzero data.

19. The storage medium of claim 16, wherein the mask comprises a bit string mask.

20. The storage medium of claim 15, wherein the instructions, when executed by the machine, cause the machine to:

perform the training until the intermediate models converge on a sparsity to produce a given intermediate model;

tune the given intermediate model, wherein the tuning produces a second plurality of models corresponding to different versions of a second sparsified model for the CNN model; and perform the tuning until the second plurality of models converge on an accuracy.

21. The storage medium of claim 20, wherein the instructions, when executed by the machine, cause the machine to:

use a group lasso in the training to manipulate sparsities of the intermediate models.

* * * * *